(12) United States Patent
Weggel et al.

(10) Patent No.: US 9,444,320 B1
(45) Date of Patent: Sep. 13, 2016

(54) POWER CONTROLLER HAVING ACTIVE VOLTAGE BALANCING OF A POWER SUPPLY

(71) Applicant: Performance Controls, Inc., Montgomeryville, PA (US)

(72) Inventors: Craig R. Weggel, Dresher, PA (US); Donald A. Yost, Lansdale, PA (US); Anthony J. Boodhansingh, North Wales, PA (US); Brian J. Fenstermacher, Quakertown, PA (US)

(73) Assignee: PERFORMANCE CONTROLS, INC., Montgomeryville, PA (US)

( * ) Notice: Subject to any disclaimer, the term of this patent is extended or adjusted under 35 U.S.C. 154(b) by 243 days.

(21) Appl. No.: 13/828,743

(22) Filed: Mar. 14, 2013

Related U.S. Application Data

(60) Provisional application No. 61/624,748, filed on Apr. 16, 2012.

(51) Int. Cl.
*H02M 3/335* (2006.01)
*H02M 1/00* (2006.01)
*H02M 3/28* (2006.01)
*H02M 7/15* (2006.01)

(52) U.S. Cl.
CPC ........... *H02M 1/00* (2013.01); *H02M 3/33561* (2013.01); *H02M 3/285* (2013.01); *H02M 7/153* (2013.01)

(58) Field of Classification Search
USPC .......... 363/34, 37, 65, 67–72, 124, 125, 131
See application file for complete search history.

(56) References Cited

U.S. PATENT DOCUMENTS

| | | | |
|---|---|---|---|
| 4,135,235 A | 1/1979 | Baker | |
| 4,167,775 A | 9/1979 | Baker et al. | |
| 4,203,151 A | 5/1980 | Baker | |
| 4,220,988 A | 9/1980 | Baker et al. | |
| 5,345,375 A | 9/1994 | Mohan | |
| 5,355,297 A | 10/1994 | Kawabata et al. | |
| 5,481,448 A | 1/1996 | Nakata et al. | |
| 5,532,575 A | 7/1996 | Ainsworth et al. | |
| 5,642,275 A | 6/1997 | Peng et al. | |
| 5,644,483 A | 7/1997 | Peng et al. | |
| 5,841,645 A | 11/1998 | Sato | |
| 6,031,738 A * | 2/2000 | Lipo et al. | 363/37 |
| 6,314,007 B2 * | 11/2001 | Johnson et al. | 363/37 |
| 6,392,907 B1 | 5/2002 | Ichikawa | |
| 7,230,837 B1 * | 6/2007 | Huang et al. | 363/71 |
| 7,423,412 B2 | 9/2008 | Weng et al. | |
| 7,528,505 B2 | 5/2009 | Ritter et al. | |
| 7,573,732 B2 | 8/2009 | Teichmann | |
| 8,294,306 B2 * | 10/2012 | Kumar et al. | 307/140 |
| 8,441,820 B2 * | 5/2013 | Shen et al. | 363/56.01 |
| 8,842,452 B2 * | 9/2014 | Nielsen | 363/37 |
| 2007/0285048 A1 * | 12/2007 | Leach et al. | 320/101 |

FOREIGN PATENT DOCUMENTS

GB 2142484 3/1997

* cited by examiner

*Primary Examiner* — Jeffrey Gblende
(74) *Attorney, Agent, or Firm* — Steven M. Koehler; Westman, Champlin & Koehler, P.A.

(57) ABSTRACT

A power controller includes a plurality of power supply output circuits and a multi-level converter connected to the plurality of power supply output circuits to receive a plurality of sets of voltages. The multi-level converter is configured to supply power to a load from a plurality of output terminals. An observer module is operably coupled to the multi-level converter to selectively control multi-level converter common-mode voltage with respect to the plurality of power supply output terminals.

20 Claims, 3 Drawing Sheets

POWER CONTROLLER HAVING ACTIVE VOLTAGE BALANCING OF A POWER SUPPLY

CROSS-REFERENCE TO RELATED APPLICATION

The present application is based on and claims the benefit of U.S. provisional patent application Ser. No. 61/624,748, filed Apr. 16, 2012, the content of which is hereby incorporated by reference in its entirety.

BACKGROUND

The output voltage capability of PWM (pulse width modulated) amplifiers is ultimately limited by the availability of power transistors of requisite voltage rating. To overcome this limitation, numerous power converter architectures have been proposed that place two or more transistors in a series circuit connection such that the transistor voltage ratings become additive. One such architectural family of power converters is known as multi-level converters. Multi-level power converters are known. In the multi-level converter, the output transistors are placed directly in series across a DC power supply comprising two or more independently powered DC power supplies with output voltages commensurate with the voltage rating of the individual output transistors.

One type of multi-level converter is the diode-clamped multi-level converter (DCMLC). This circuit topology uses series arrangements of diodes and capacitors to establish the intermediate node voltages for the DCMLC. Such converters are well known. U.S. Pat. No. 6,031,738 describes and illustrates such a converter and is incorporated herein by reference in its entirety.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background. A first aspect of the present invention comprises a power controller having a power supply with a plurality of output terminals and a multi-level converter connected to the plurality of output terminals to receive a plurality of sets of voltages. The multi-level converter is configured to supply power to a load from a plurality of converter output terminals. An observer module is operably coupled to the multi-level converter to selectively control multi-level converter common-mode voltage with respect to the plurality of power supply output terminals.

A second aspect of the present invention comprises a power controller having a power supply that includes a plurality of power supply output circuits, each power supply output circuit configured to provide a set of voltages. A primary control loop is configured to provide an output command signal. A multi-level converter is connected to the plurality of power supply output circuits to receive each associated set of voltages. The multi-level converter is operably connected to the primary control loop and configured to supply power to a load from a plurality of output terminals based on the output command signal. A common mode control loop is configured to provide a common mode command signal based on an indication of a voltage imbalance between the sets of voltages of the plurality of power supply output circuits. An observer module is operably coupled to the primary control loop and the multi-level converter to selectively change the output command based on the common mode command signal.

A third aspect of the present invention comprises a method of supplying power to a load using a multi-level converter wherein the load is connected across converter output terminals of the multi-level converter. The method includes supplying an output command signal to the multi-level converter, the output command signal being indicative of a desired voltage across the output terminals; and supplying a plurality of sets of voltages to input terminals of the multi-level converter. The method also includes supplying power to the multi-level converter via only one of the sets of voltages when the desired voltage across the multi-level converter output terminals does not exceed a selected voltage. The method further includes supplying power to the multi-level converter via each of the sets of voltages when the desired voltage across the multi-level converter output terminals exceeds the selected voltage; and changing the output command signal provided to the multi-level converter based on a voltage imbalance between two of the sets of voltages.

DETAILED DESCRIPTION OF THE ILLUSTRATIVE EMBODIMENTS

Before describing illustrative embodiments of the invention with reference to the Figures, it should be understood that the depiction, arrangement and/or description of all of the various modules, components and the like herein are done so for the purposes of understanding the purpose or role of such elements and should not be considered limiting, but rather that such modules, components and the like can be combined together or separated as desired. In addition, analog and/or digital circuitry or hardware can be used to implement the modules, components and the like where, if necessary, analog-to-digital and digital-to-analog converters are used. Many of the modules, components and the like can also be implemented using software executed on processing circuitry having a suitable processor with memory to store the executable instructions and/or data. The circuitry can further include without limitation logic arrays and a system on a chip implementation that integrates some if not all circuitry and components of a computer or other electronic system that processes digital signals, analog signals, and/or mixed digital and analog signals on a single chip substrate.

Figure 1:
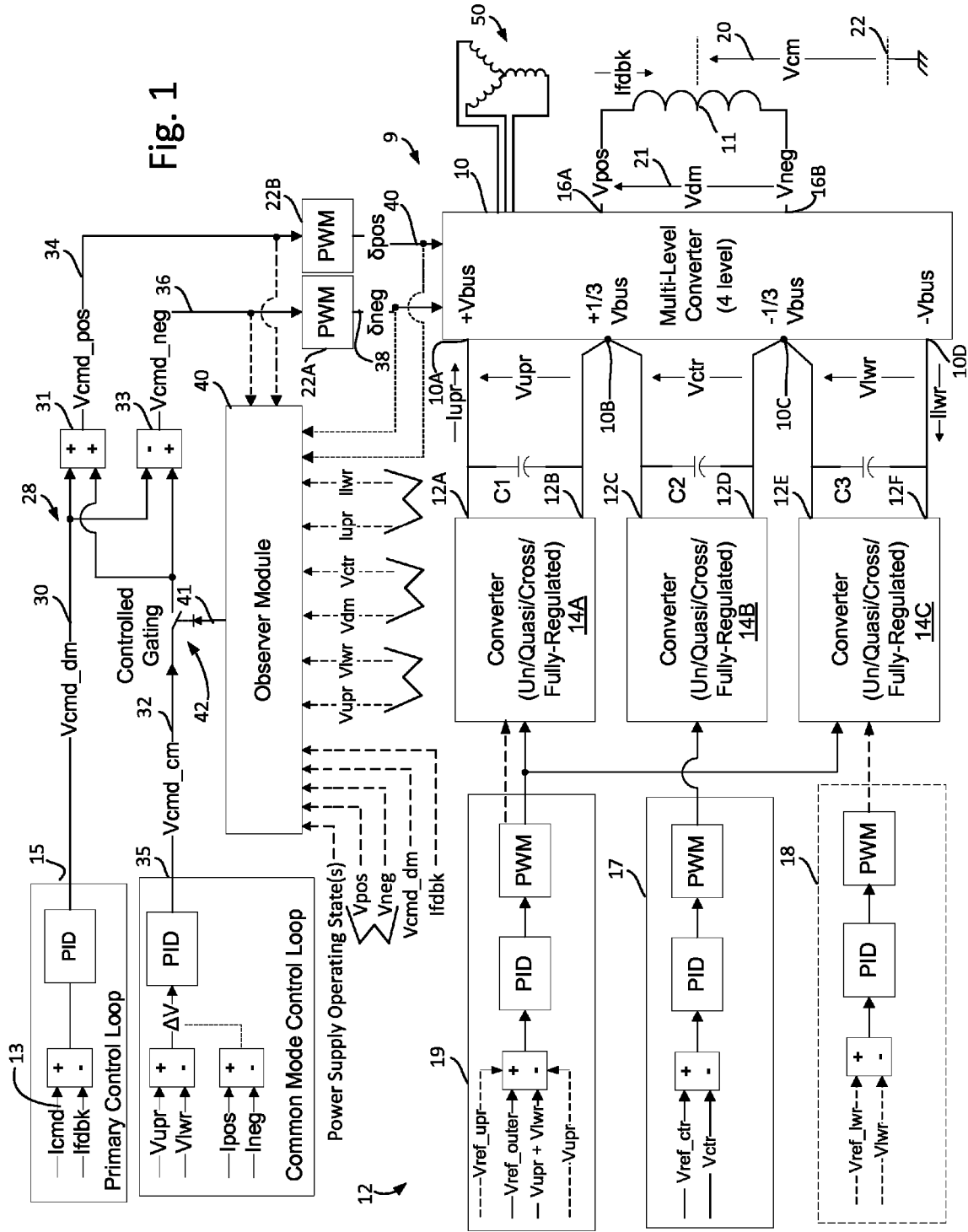
FIG. 1 is a power controller with a first embodiment of a power supply.

Referring to FIG. 1, a power controller 9 having a multi-level converter 10 (herein by way of example, 4-level) provides an output current through load 11 proportional to an input command signal 13 as illustrated schematically by a primary control loop 15 (herein exemplified as a PID (proportional, integral and differential) control loop). It should be noted that the primary control loop 15 comprising PID control topology (as well as all the control loops depicted in the Figures with PID control topology) is but one example and should not be considered limiting because, if desired, other control topologies can be used in any of the control loops illustrated. It should also be noted that aspects of the invention are not limited to a primary control loop 15 comprising current control. For example, the primary control loop 15 might comprise voltage control.

The DC power supply 12 includes output terminals 12A, 12B, 12C, 12D, 12E and 12F that provide a plurality of voltage sets herein identified as Vupr, Vctr and Vlwr, which are electrically connected to input terminals 10A, 10B, 10C and 10D. The power supply 12 can be considered to have three power supply output circuits to provide voltage sets (typically DC), the power supply output circuits being part each of converters 14A, 14B and 14C, respectively. Although illustrated in the exemplary embodiment where three sets of voltages as Vupr, Vctr and Vlwr are generated and provided to input terminals of a 4-level converter, it should be understood that this is but one embodiment and that the power supply 12 can be configured to provide further voltage sets, which are then connected in series to a multi-level converter in which the number of input terminals is one more than the number of voltage sets provided by the power supply 12.

The power supply 12 typically includes or is connected to a capacitor bank C1, C2, and C3, one for each of the voltage sets as Vupr, Vctr and Vlwr, respectively. The capacitors C1-C3 are intended to support transient high current demands while exhibiting minimal voltage droop. While it is optional to use independent voltage regulators for each supply, in the case where unregulated supply circuits are used for reduced complexity and cost, an imbalance in supply voltages can occur if the current draw from the converters 14A-14C differs. In many embodiments, the center converter 14B (Vctr) is required or designed to provide the majority of the output power, particularly at lower output voltages across terminals 16A-16B and is controlled by controller 17 in FIG. 1. In this manner, the outer converters 14A and 14C (Vupr, Vlwr) can be of a simpler design and smaller in size, each of which being controlled by the same controller 19 in FIG. 1.

Although in yet a further embodiment, separate controllers 17, 18 and 19 can be used to control each of the converters 14B, 14C and 14A, respectively as illustrated with dashed lines in FIG. 1. In particular, in this embodiment controller 17 still controls converter 14B in the manner described above. However, controller 19 receives as inputs Vref_upr and Vupr as indicated in dashed lines (rather than Vref_outer and Vupr+Vlwr) and controls only converter 14A also indicated by a dashed line. In this further embodiment, controller 18 is added and receives as inputs Vref_lwr and Vlwr and controls only converter 14C.

In operation, when the voltage desired across terminals 16A and 16B exceeds the capability of center supply circuit 14B, additional power is then provided by converters 14A and 14C because the voltage set Vupr is connected in series with one of the voltages of voltage set Vctr, while the voltage set Vlwr is connected in series with the other voltage of voltage set Vctr. Additionally, due to the nature of the load, the ideal current demand from the two outer converters 14A and 14C should be equal, so a low-cost unregulated (or cross-regulated) power supply design approach, in one embodiment, is appropriate for the two outer converters 14A and 14C.

Figure 2:
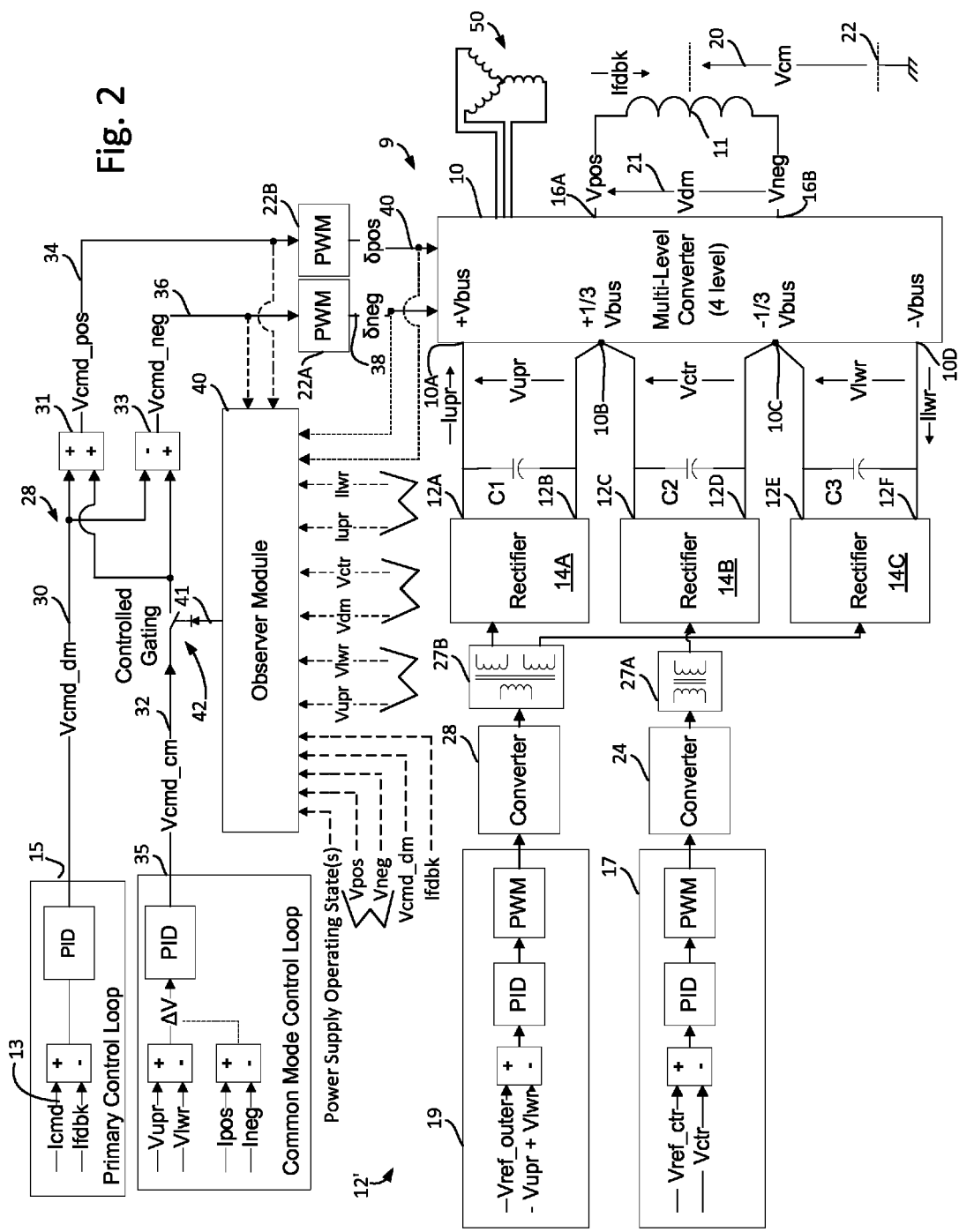
FIG. 2 is the power controller with a second embodiment of a power supply.
Figure 3:
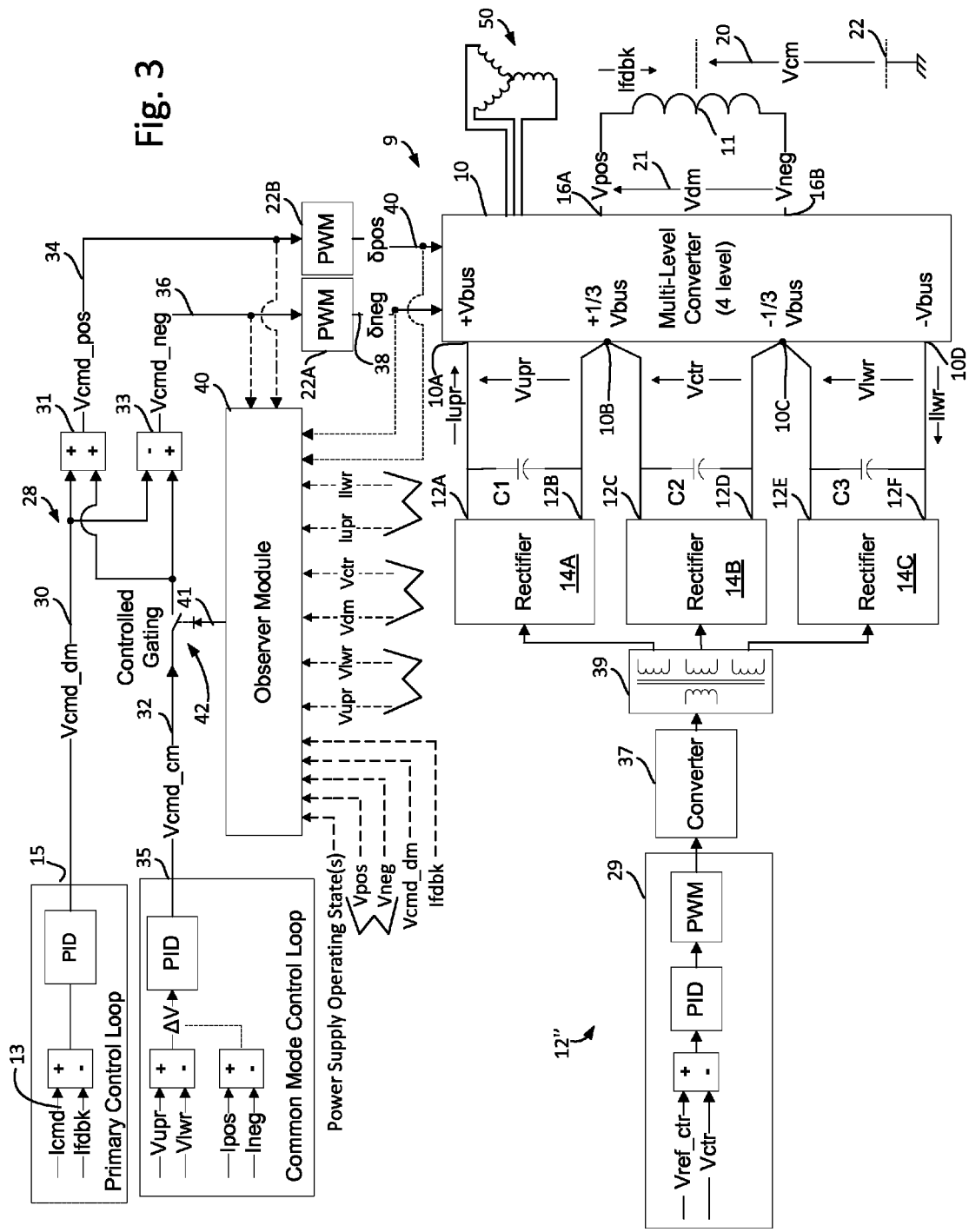
FIG. 3 is the power controller with a third embodiment of a power supply.

In the embodiments of FIG. 1, the converters 14A-14C each include a converter; however, this should not be considered limiting. In particular, the power supply 12 can take alternative forms, two of which are exemplified in FIGS. 2 and 3 as 12' and 12", respectively. In FIG. 2, the power supply 12' includes controllers 17 and 19 configured to operate in the same manner as that of the embodiment of FIG. 1; however in this embodiment, controller 17 controls converter 24 that is connected to a power supply output circuit 14B comprising a rectifier circuit through a transformer 27A. Controller 19 controls a converter 28 that is connected to each of power supply output circuits 14A and 14C through a transformer 27B having a single primary and two secondary windings. As used herein the power supply output circuits comprise those electrical components connected to the output terminals 12A-12F. Hence, in the embodiment of FIG. 2, the power supply output circuits 14A-14C include rectifier circuits, respectively. The embodiment of FIG. 2 may be advantageous over the embodiment of FIG. 1 since it only includes two converters 24 and 28. In the embodiment of FIG. 3, the power supply 12" includes a single controller 29 receiving a signal indicative of Vctr (or additionally, could include Vupr and Vlwr), which are used to control a converter 37 that in turn drives each of power supply output circuits 14A-14C through a transformer 39 having a single primary winding and three secondary windings, one for each of power supply output circuits 14A-14C. Like the power supply 12', the power supply output circuits 14A-14C include rectifier circuits. The embodiment of FIG. 3 may be yet more advantageous over the embodiments of FIG. 1 or FIG. 2 since it only includes one converter 37.

Ideally, the voltages across all of the series-connected power supply capacitors C1-C3 are the same. However, due to limitations and variations of the hardware in actual implementations of the DCMLC, non-ideal modulation switching of the transistors can and will occur. The resulting lack of symmetry of the multi-level converter output voltages 16A, 16B results in an unbalanced flow of current from one of the outer capacitor banks C1, C3 relative to its symmetric counterpart of opposite polarity. Over time, this results in a substantial imbalance of outer capacitor voltages (measured across C1 and C3). This condition would result in unacceptability high voltages being applied across the related transistor and diode pair, leading to failure.

As an aspect of the invention to prevent the aforementioned problem, additional circuit elements can be applied to detect and correct this tendency for imbalance. The voltages of all of the series capacitors are typically already measured and fed back to the power supply system controller(s) (e.g. controllers 17, 18 and 19, or controller 29) used to create the multi-level power supply for the multi-level converter 10. However, from these measurements, a term can be calculated, through analog and/or digital circuit elements, that is indicative of the sign and magnitude of the voltage imbalance between the set of voltages Vupr and Vlwr from power supply output circuits 14A and 14C. The calculated term is used selectively to correct the power supply imbalance by adjusting the common mode output voltage of the PWM amplifier across the load 11.

Pulse Width Modulated (PWM) amplifiers are well known. Typically, PWM is used to adjust the average value of the differential mode output voltage, Vdm across terminals 16A-16B that is used to control the voltage or current to the load 11. Vdm is defined as the voltage difference between any pair of output terminals (e.g. terminals 16A-16B) of the multi-level converter 10.

$$Vdm = Vpos - Vneg$$

In the control topology herein described, common-mode voltage of the amplifier output relative to the power supply output is controlled. Common-mode voltage is defined as the average voltage of all the output terminals 16A-16B of a multi-level converter 10. Typically, the common mode voltage (Vcm) 20 is determined with respect to earth ground 22, or other reference potential.

For a two terminal multi-level converter 10 as illustrated herein by way of example, $$Vcm = \frac{Vpos + Vneg}{2}$$

Significantly, Vcm can be independently controlled without effect on the differential output voltage Vdm.

It is this property of independence that makes it possible to compensate for the voltage imbalance of power supply output circuits 14A and 14C for the multi-level converter 10. (This ability to control CM voltage is not limited to multi-level converters.)

To illustrate how independent control over the common and difference output voltages is obtained, the output terminal equations at terminals 16A and 16B can be rewritten in terms of the common and difference term voltages.

$$Vpos = Vcm + \frac{1}{2}Vdm$$

and $$Vneg = Vcm - \frac{1}{2}Vdm$$

Vneg and Vpos are the pole voltages of the output of the multi-level converter 10. They are in turn controlled through the pulse width modulation process, via modulators 22A and 22B in which a continuously variable term is converted, for example, in a two-level converter, to a pulse width in accordance with the following equation.

$$Vpole = (2\delta - 1)Vbus$$

where δ is the duty cycle of the modulation.

Rewriting in terms of the desired pole output voltage, the duty cycle is $$\delta = \frac{Vpole}{2\,Vbus} + \frac{1}{2}$$

Combining, $$\delta pos = \frac{Vcm}{2\,Vbus} + \frac{Vdm}{4\,Vbus} + \frac{1}{2}$$

$$\delta neg = \frac{Vcm}{2\,Vbus} - \frac{Vdm}{4\,Vbus} + \frac{1}{2}$$

Independent control can thus be provided to control the common mode output voltage Vcm 20 of the multi-level converter 10 without affecting the difference mode output voltage Vdm 21, which generally is the desired and controlled output. However, as discussed below, for the power controller 9 of the embodiments of FIGS. 1-3, this control of the common mode output voltage is done selectively based on the operating state of the power supply 12, 12' or 12" or the multi-level converter 10.

As illustrated in FIG. 1, generally, circuitry 28 algebraically combines independent control variables, Vdm and Vcm, to yield a net control over the PWM duty cycle, and thus the output voltage, of the several output totem-poles of the multi-level converter 10. In the power controller 9, control variables Vdm and Vcm are realized as command signals Vcmd_dm (voltage command difference mode) 30 from the primary control loop 15 and Vcmd_cm (voltage command common mode) 32, which is realized by common mode control loop 35, in one embodiments, by obtaining the difference between the voltage sets of power supply output circuits 14A and 14C. In an alternative embodiment, signals indicative of the currents Ipos and Ineg can be used.

Vcmd_cm 32 is used to change (as explained below "selectively") Vcmd_dm 30. In the embodiments illustrated, outputs Vcmd_dm 30 and Vcmd_cm 32, if being provided, are combined by summers 31 and 33 to realize command signals $Vcmd_{pos}$ 34 and $Vcmd_{neg}$ 36 indicative of the desired voltage of output terminals 16A and 16B, respectively. As known to those skilled in the art, suitable analog and/or digital circuitry can be used so as to generate values of Vcmd_dm 30, Vcmd_cm 32, $Vcmd_{pos}$ 34 and $Vcmd_{neg}$ 36 and the duty cycles for the two output poles 38 and 40 as analog circuit quantities using analog circuitry, and/or by appropriate numerical representations in a digital circuit implementation.

Variation of the common mode output voltage of a PWM amplifier, inevitably due to small, expected variations in the behavior of any of the components in the amplifier, produces an asymmetry in the current drawn from the positive and negative DC power supply output circuits, as well as the generation of an undesired common-mode output. The difference in the magnitudes of the respective current will over time result in a change in the voltage of the positive and negative DC power supply output circuit voltages.

$$\Delta V(t) = \frac{2}{Cps} \int_0^t (Iupr - Ilwr)\,dt$$

Where, Cps is the value of the outer power supply output circuit capacitors (i.e. C1*C3/[C1+C3]).

In the case of the multi-level converter 10, the power supply 12 includes two or more DC power supply output circuits 14A and 14C, as previously described. Also as previously mentioned, the DC power supply output circuits 14A and 14C can become unbalanced. Therefore, one aspect of this invention is to control the common mode output voltage to achieve balance of the power supply output circuits, through the use of a simple control loop, without affecting the desired output current.

However, with the power controller 9, a complication arises with respect to the use of common-mode output voltage control, in that the power supply output circuit capacitors' voltages can only be controlled when the multi-level converter 10 is in a state that results in current flow through the respective capacitors. In general purpose amplifiers capable of producing arbitrary waveforms, this is true when the differential output voltage Vdm 21 has been commanded to attain a value between the two poles of one of the outer power supply output circuits 14A, 14C, as measured with respect to the same potential. Stated another way, control is possible when the differential output voltage Vdm 21 exceeds the capability of power supply output circuit 14B. If the common-mode correction is applied to the output when this is not the case, a persistent undesirable common-mode voltage waveform will appear on the output terminals 16A, 16B, because the control loop commanding said voltage cannot be satisfied. The adverse effects of the common-mode output voltage include increased noise in the desired differential output, and excessive thermal losses in any output filtering components, due to persistently applied, unnecessary switching voltages. Conversely, it is only when the output is commanded to output voltages that access the outer power supply output circuits 14A, 14C that an imbalance in those supply circuits will potentially be created. In this condition, any resulting voltage imbalance will create an error signal that will drive the common mode output voltage in a direction that simultaneously reduces the net common-mode output voltage and restores balance of the power supply output circuit capacitors.

processing modules in order to calculate values or otherwise process the input(s) in order to make a comparison such as but not limited to circuitry or processing instructions to obtain a derivative of the input(s) as described below. As illustrated, the observer module 40 controls when Vcmd_cm 32 is used to change Vcmd_dm 30.

In the embodiment illustrated in the FIG. 1, observer module 40 ascertains when the output voltage Vdm 21 across terminals 16A-16B exceeds that of center supply circuit 14B, thus requiring the use of outer supply circuits 14A and 14C. This condition can, if desired, be measured directly, as Vpos 16A and Vneg 16B, or as illustrated, be ascertained by measuring the command signals (i.e. the difference between $Vcmd_{pos}$ 34 and $Vcmd_{neg}$ 36, or the duty cycles for the two output poles 38 and 40).

Alternatively, the same information can be derived logically by classification of the output state of the n-level converter 10, since the state is a direct function of the differential output voltage commanded, Vcmd_dm 30 For example, for the 4-level converter, the following relationships apply:

| State Name | Command Value | Output Voltage | CM Adjustment Possible? |
|---|---|---|---|
| V− | $-Vmax < Vcmd\_dm < -\frac{1}{3}Vmax$ | $-Vbus < Vout < -\frac{1}{3}Vbus$ | Yes |
| V0 | $-\frac{1}{3}Vmax < Vcmd\_dm < \frac{1}{3}Vmax$ | $-\frac{1}{3}Vbus < Vout < \frac{1}{3}Vbus$ | No |
| V+ | $\frac{1}{3}Vmax < Vcmd\_dm < Vmax$ | $\frac{1}{3}Vbus < Vout < Vbus$ | Yes |

The increased noise and filter heating ultimately stem from the same root cause, that is, the presence of a common mode voltage, by definition, creates a current that flows out of one terminal of the amplifier but does not return in equal measure through the opposite terminal because the existence of the same voltage on both output terminals forces current to take unintended paths to return to the power supply. When this happens, the current feedback circuit is partially bypassed, particularly at higher frequencies, which leads to compromised control of the intended output current, resulting in undesirable current activity referred to as noise, and in undesirably large currents flowing in any applied filter networks, leading to excessive filter heating. Both of these effects represent degradation from the expected performance of the power controller 9.

Common-mode voltage control of the multi-level converter 10 is performed selectively. In particular, an additional element of control has been included that serves to distinguish when the output voltage Vdm 21 has been commanded to a level at which the common-mode control can be effective. Thus, the common-mode output voltage is only commanded when it can be effective (i.e. when outer power supply output circuits 14A and 14C are supplying current), and is prevented when it is not, and therefore preventing the undesirable output.

This detection is accomplished by an observer module 40 using various forms of input. In many embodiments, the observer module 40 comprises a comparator to compare the input(s) to each other or to a reference value. In further embodiments, the observer module 40 can include further The state of the multi-level converter output having been determined, the injection of the common-mode correction term, Vcmd_cm, into the modulators is then qualified by the state to allow or disallow the inclusion of the common-mode correction in term in the output command voltage.

An output signal 41 from the observer module 40 is used to control gating or use of the Vcmd_cm 32 signal. Such gating can be implemented in an analog circuit by using an analog switch 42 and summing either the correction signal or a zero-valued signal with the differential command voltage Vcmd_dm 30, or analogously in a digital numerical implementation.

It should be noted the gating action of the observer module 40 described above and illustrated in the schematic control block diagram of FIG. 1 is not the only means by which suitable gating action may be achieved. In particular, additional methods for determining the multi-level converter state and hence when controlled-gating of the common-mode correction signal should occur, may be more or less effective depending on the system architecture and parametric requirements. Elements regarding system architecture may involve available sensors, conditioning circuits, and analog and digital processing circuit capacities, which may be used to exploit other direct-sensing, psuedo-sensing and virtual-sensor methods for determining when the multi-level converter is operating in a given state.

Other techniques for ascertaining controlled-gating of the common-mode correction signal include, but are not limited to:

1) The observer module 40 can use measurement and feedback of the multi-level converter output pole voltages (Vpos, Vneg) and/or currents (Ifdbk with or without knowledge of the load characteristic) to indicate the state in which the multi-level converter 10 is operating. This information can be used to provide appropriate gating control of the common-mode signal correction term. The approach described here applies equally to a current-mode or voltage-mode output multi-level converter.

2) In many systems, the bus currents from the various voltage rails feeding the multi-level converter 10 may be sensed and utilized by the observer module 40. The monitored currents of complimentary voltage outputs may be sensed and integrated to determine a change in voltage between complimentary converter outputs which might generally be termed as $\Delta V(t)$. For the 4-level architecture illustrated, Iupr and Ilwr represent the current signals of complimentary voltage converter outputs. Integrating these terms yields information regarding voltage imbalance over time and can be used to provide controlled-gating of the common-mode correction signal since these currents will only be varying when the multi-level converter 12 is actively transferring energy to/from these outer supply circuits 14A and 14C.

3) In regulated applications, the output voltages of the power supply output circuits feeding the multi-level architecture would be available for the purposes of regulation. Additionally, analog or digital computational methods may be employed to calculate the derivative of complimentary converter output voltages, Vupr and Vlwr. In the case of the illustration, d(Vupr)/dt and d(Vlwr)/dt would be computed. A non-zero derivative would serve as a proxy signal for when the multi-level converter 10 is operating in a state potentially requiring balance. The magnitude and/or sign information of the derivative may be utilized by the observer module 40 to provide controlled-gating of the common-mode correction signal.

4) In regulated applications, the on-time (duty cycle, phase, and/or frequency control, etc.) of the complimentary converters may be used by the observer module 40 as a proxy for estimating when the multi-level converter 10 is drawing energy from a given supply and hence serve to indicate when to gate the common-mode correction signal. The premise here is that the on-time is proportional to the load demand on a given converter or set of converters, and hence on-time serves as an indication of when a given converter is being utilized and common-mode signal should be injected.

It should also be noted that aspects of the invention and the power controller 9 herein described applies to sinusoidal as well as arbitrary wave shapes. Further the power controller 9 is not limited to providing power to only a single phase load 11, but rather, aspects of the invention can also be used with a multi-level converter configured to provide power to a multi or poly phase load, herein illustrated as a three phase load 50. As appreciated by those skilled in the art, providing power to the multi-phase load 50 commonly entails using a multi-level converter configured to receive output poles for each phase, and the circuitry and/or modules to generate each output pole rather than the two output poles 38 and 40, illustrated with the single phase load 11.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A single-phase power controller comprising:
a multi-level converter having a plurality of input terminals configured to connect to a power supply and receive a plurality of sets of voltages, the multi-level converter configured to supply single-phase power to a load from a plurality of converter output terminals;
an observer module operably coupled to the multi-level converter to selectively control multi-level converter common-mode voltage with respect to the plurality of power supply output terminals; and
a common mode control loop circuit configured to provide a common mode command signal, wherein the observer module is configured to selectively control use of the common mode command signal to control the multi-level converter common mode voltage on the converter output terminals based on the voltage across the multi-level converter output terminals.

2. A single-phase power controller comprising:
a multi-level converter having a plurality of input terminals configured to connect to a power supply and receive a plurality of sets of voltages, the multi-level converter configured to supply single-phase power to a load from a plurality of converter output terminals;
an observer module operably coupled to the multi-level converter to selectively control multi-level converter common-mode voltage with respect to the plurality of power supply output terminals; and
a primary control loop configured to provide an output command signal and a common mode control loop circuit configured to provide a common mode command signal, wherein the observer module is configured to control the multi-level converter common mode voltage on the converter output terminals by selectively combining the output command signal and the common mode command signal.

3. A single-phase power controller comprising:
a multi-level converter having a plurality of input terminals configured to connect to a power supply and receive a plurality of sets of voltages, the multi-level converter configured to supply single-phase power to a load from a plurality of converter output terminals; and
an observer module operably coupled to the multi-level converter to selectively control multi-level converter common-mode voltage with respect to the plurality of power supply output terminals, wherein the observer module is configured to selectively control the multi-level converter common mode voltage on the converter output terminals of the multi-level converter when a voltage across the converter output terminals exceeds a voltage across a pair of the plurality of output terminals.

4. The single-phase power controller of claim 1 wherein the observer module is configured to selectively control the multi-level converter common mode voltage on the converter output terminals based on the operating state of the power supply.

5. A power controller comprising:
a power supply having a plurality of power supply output circuits, each power supply output circuit configured to provide a set of voltages;
a primary control loop configured to provide an output command signal, wherein the output command comprises a first command signal related to a voltage at a first terminal of the plurality of output terminals and a second command signal related to a voltage at a second terminal of the plurality of output terminals;

a multi-level converter connected to the plurality of power supply output circuits to receive each associated set of voltages, the multi-level converter operably connected to the primary control loop and configured to supply power to a load from a plurality of multi-level converter output terminals based on the output command signal;

a common mode control loop configured to provide a common mode command signal based on an indication of a voltage imbalance between the sets of voltages of the plurality of power supply output circuits; and an observer module operably coupled to the primary control loop to receive the first command signal and the second command signal, wherein the observer module is configured to selectively change the output command signal based on the first command signal and the second command signal, the observer module being further operably coupled to the multi-level converter to selectively change the output command based on the common mode command signal.

6. The power controller of claim 5 wherein the plurality of power supply output circuits comprise:

a first power supply output circuit configured to provide a first set of voltages to the multi-level converter, the first set of voltages comprising a first voltage and a second voltage, the second voltage being greater than the first voltage;

a second power supply output circuit configured to provide a second set of voltages to the multi-level converter, the second set of voltages being connected in series to the first voltage; and a third power supply output circuit configured to provide a third set of voltages to the multi-level converter, the third set of voltages being connected in series to the second voltage.

7. The power controller of claim 6 wherein the common mode control loop is configured to provide the common mode command signal based on the second set of voltages and the third set of voltages.

8. The power controller of claim 6 wherein the common mode control loop is configured to provide the common mode command signal based on a current of the second power supply output circuit and a current of the third power supply output circuit.

9. The power controller of claim 6 wherein the common mode control loop is configured to provide the common mode command signal based on a common mode voltage across the plurality of multi-level converter output terminals.

10. The power controller of claim 6 wherein the observer module is configured to selectively change the output command signal when the second power supply output circuit provides the second set of voltages to the load by means of the multi-level converter and the third power supply output circuit provides the third set of voltages to the load by means of the multi-level converter.

11. The power controller of claim 6 wherein the observer module is configured to selectively change the output command signal based on presence of current in at least one of the second power supply output circuit and the third power supply output circuit.

12. The power controller of claim 6 wherein the observer module is configured to selectively change the output command signal when voltage across the output terminals exceeds a voltage across the first set of voltages.

13. The power controller of claim 6 wherein the observer module selectively controls the multi-level converter common mode voltage on the converter output terminals based on current through the multi-level converter output terminals.

14. The power controller of claim 6 wherein the observer module is configured to selectively change the output command signal based on at least one of a derivative of the second set of voltages and a derivative of the third set of voltages.

15. The power controller of claim 6 wherein the power supply comprises a controller operably connected to a converter configured to drive each of the power supply output circuits.

16. The power controller of claim 6 wherein the power supply comprises:

a first controller operably connected to a first converter to drive the first power supply output circuit; and a second controller operably connected to a second converter to drive each of the second and third power supply output circuits.

17. The power controller of claim 6 wherein the power supply comprises:

a first controller operably connected to a first converter comprising the first power supply output circuit; and a second controller operably connected to a second converter and a third converter, the second converter comprising the second power supply output circuit and the third converter comprising the third power supply output circuit.

18. A method of supplying single-phase power to a load using a multi-level converter wherein the load is connected across the multi-level converter output terminals of the multi-level converter, the method comprising:

supplying an output command signal to the multi-level converter, the output command signal being indicative of a desired single-phase voltage across the output terminals;

supplying a plurality of sets of voltages to input terminals of the multi-level converter;

when the desired voltage across the converter output terminals does not exceed a selected voltage, supplying power to the multi-level converter via only of one of the sets of voltages; and when the desired voltage across the converter output terminals exceeds the selected voltage, supplying power to the multi-level converter via each of the sets of voltages; and changing the output command signal provided to the multi-level converter based on a voltage imbalance between two of the sets of voltages and to control multi-level converter common-mode voltage with respect to the plurality of power supply output terminals and to control common mode voltage on the converter output terminals of the multi-level converter.

19. The power controller of claim 5 wherein the power controller is a single-phase power controller and the multi-level converter is configured to supply single-phase power from the output terminals.

20. The single-phase power controller of claim 2 wherein the observer module is configured to selectively control the multi-level converter common mode voltage on the converter output terminals based on the operating state of the power supply.

\* \* \* \* \*